(12) United States Patent
Kaneko et al.

(10) Patent No.: US 8,253,707 B2
(45) Date of Patent: Aug. 28, 2012

(54) INFORMATION PROCESSING APPARATUS AND METHOD

(75) Inventors: Kazue Kaneko, Kawasaki (JP); Katsutoshi Nagato, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 423 days.

(21) Appl. No.: 12/494,455

(22) Filed: Jun. 30, 2009

(65) Prior Publication Data
US 2010/0007623 A1    Jan. 14, 2010

(30) Foreign Application Priority Data

Jul. 11, 2008 (JP) ................................ 2008-181985
Apr. 1, 2009 (JP) ................................ 2009-089182

(51) Int. Cl.
*G06F 3/041* (2006.01)

(52) U.S. Cl. ...................... 345/173; 715/764

(58) Field of Classification Search .......... 345/173–178, 345/440, 629; 715/700, 209, 244–277, 764–799
See application file for complete search history.

(56) References Cited

U.S. PATENT DOCUMENTS

| 7,138,983 | B2 | 11/2006 | Wakai et al. | 345/173 |
| 7,468,727 | B2 * | 12/2008 | Wong et al. | 345/440 |
| 2006/0010402 | A1 * | 1/2006 | Undasan | 715/861 |
| 2006/0161861 | A1 * | 7/2006 | Holecek et al. | 715/782 |
| 2006/0209085 | A1 * | 9/2006 | Wong et al. | 345/629 |
| 2007/0061716 | A1 * | 3/2007 | Kato | 715/530 |
| 2007/0109281 | A1 * | 5/2007 | Simmons et al. | 345/179 |
| 2008/0184112 | A1 * | 7/2008 | Chiang et al. | 715/700 |

FOREIGN PATENT DOCUMENTS

JP    2001-290585    10/2001

* cited by examiner

*Primary Examiner* — Amare Mengistu
*Assistant Examiner* — Vinh Lam
(74) *Attorney, Agent, or Firm* — Fitzpatrick, Cella, Harper & Scinto

(57) ABSTRACT

In instances where a plurality of objects is aligned by an operation using a pointing device having only a single point for pointing, the procedure is a troublesome one. To solve this problem, an information processing apparatus according to the invention includes a display unit configured to display objects; a recognition unit configured to recognize that a plurality of positions on the display unit have been designated; and an alignment unit. In a state in which a first position contained in an area in which a plurality of objects are displayed has been recognized by the recognition unit and a second position on the display unit has been recognized by the recognition unit, the alignment unit aligns the plurality of objects on the display unit in accordance with path of movement when movement of the first position or second position has been detected.

13 Claims, 18 Drawing Sheets

FIG. 3A

| ID | SHAPE | CENTER POSITION | | SIZE | | ROTATE | SELECT | ALIGNMENT | PRE-ALIGNMENT POSITION | |
|---|---|---|---|---|---|---|---|---|---|---|
| | | x | y | HORIZONTAL | VERTICAL | | | | x | y |
| IMG0001 | RECTANGLE | 276 | 517 | 106 | 135 | 90 | FALSE | FALSE | NONE | NONE |
| IMG0002 | RECTANGLE | 363 | 573 | 106 | 135 | 10 | FALSE | FALSE | NONE | NONE |
| IMG0003 | RECTANGLE | 390 | 623 | 106 | 135 | 3 | FALSE | FALSE | NONE | NONE |
| IMG0004 | RECTANGLE | 313 | 680 | 106 | 135 | 175 | FALSE | FALSE | NONE | NONE |
| IMG0005 | RECTANGLE | 260 | 593 | 106 | 135 | 70 | FALSE | FALSE | NONE | NONE |
| IMG0006 | RECTANGLE | 229 | 653 | 106 | 135 | 130 | FALSE | FALSE | NONE | NONE |
| IMG0007 | RECTANGLE | 180 | 573 | 106 | 135 | 120 | FALSE | FALSE | NONE | NONE |
| IMG0008 | RECTANGLE | 150 | 463 | 106 | 135 | 175 | FALSE | FALSE | NONE | NONE |
| ... | ... | ... | ... | ... | ... | ... | ... | ... | ... | ... |

| ID | SHAPE | CENTER POSITION | | SIZE | | ROTATE | SELECT | ALIGNMENT | PRE-ALIGNMENT POSITION | |
|---|---|---|---|---|---|---|---|---|---|---|
| | | x | y | HORIZONTAL | VERTICAL | | | | x | y |
| IMG0001 | RECTANGLE | 276 | 517 | 106 | 135 | 90 | TRUE | FALSE | NONE | NONE |
| IMG0002 | RECTANGLE | 363 | 573 | 106 | 135 | 10 | TRUE | FALSE | NONE | NONE |
| IMG0003 | RECTANGLE | 390 | 623 | 106 | 135 | 3 | TRUE | FALSE | NONE | NONE |
| IMG0004 | RECTANGLE | 313 | 680 | 106 | 135 | 175 | TRUE | FALSE | NONE | NONE |
| IMG0005 | RECTANGLE | 260 | 593 | 106 | 135 | 70 | TRUE | FALSE | NONE | NONE |
| IMG0006 | RECTANGLE | 229 | 653 | 106 | 135 | 130 | TRUE | FALSE | NONE | NONE |
| IMG0007 | RECTANGLE | 180 | 573 | 106 | 135 | 120 | TRUE | FALSE | NONE | NONE |
| IMG0008 | RECTANGLE | 150 | 463 | 106 | 135 | 175 | FALSE | FALSE | NONE | NONE |
| ... | ... | ... | ... | ... | ... | ... | ... | ... | ... | ... |

| ID | SHAPE | CENTER POSITION | | SIZE | | ROTATE | SELECT | ALIGNMENT | PRE-ALIGNMENT POSITION | |
| --- | --- | --- | --- | --- | --- | --- | --- | --- | --- | --- |
| | | x | y | HORIZONTAL | VERTICAL | | | | x | y |
| IMG0001 | RECTANGLE | 276 | 517 | 106 | 135 | 90 | TRUE | TRUE | 276 | 517 |
| IMG0002 | RECTANGLE | 363 | 573 | 106 | 135 | 10 | TRUE | TRUE | 363 | 573 |
| IMG0003 | RECTANGLE | 390 | 623 | 106 | 135 | 3 | TRUE | TRUE | 390 | 623 |
| IMG0004 | RECTANGLE | 313 | 680 | 106 | 135 | 175 | TRUE | TRUE | 313 | 680 |
| IMG0005 | RECTANGLE | 260 | 593 | 106 | 135 | 70 | TRUE | TRUE | 260 | 593 |
| IMG0006 | RECTANGLE | 229 | 653 | 106 | 135 | 130 | TRUE | TRUE | 229 | 653 |
| IMG0007 | RECTANGLE | 180 | 573 | 106 | 135 | 120 | TRUE | TRUE | 180 | 573 |
| IMG0008 | RECTANGLE | 150 | 463 | 106 | 135 | 175 | FALSE | FALSE | NONE | NONE |
| ... | ... | ... | ... | ... | ... | ... | ... | ... | ... | ... |

| ID | SHAPE | CENTER POSITION | | SIZE | | ROTATE | SELECT | ALIGNMENT | PRE-ALIGNMENT POSITION | |
|---|---|---|---|---|---|---|---|---|---|---|
| | | x | y | HORIZONTAL | VERTICAL | | | | x | y |
| IMG0001 | RECTANGLE | 180 | 573 | 106 | 135 | 90 | TRUE | TRUE | 276 | 517 |
| IMG0002 | RECTANGLE | 290 | 573 | 106 | 135 | 90 | TRUE | TRUE | 363 | 573 |
| IMG0003 | RECTANGLE | 400 | 573 | 106 | 135 | 90 | TRUE | TRUE | 390 | 623 |
| IMG0004 | RECTANGLE | 510 | 573 | 106 | 135 | 90 | TRUE | TRUE | 313 | 680 |
| IMG0005 | RECTANGLE | 620 | 573 | 106 | 135 | 90 | TRUE | TRUE | 260 | 593 |
| IMG0006 | RECTANGLE | 730 | 573 | 106 | 135 | 90 | TRUE | TRUE | 229 | 653 |
| IMG0007 | RECTANGLE | 840 | 573 | 106 | 135 | 90 | TRUE | TRUE | 180 | 573 |
| IMG0008 | RECTANGLE | 150 | 463 | 106 | 135 | 175 | FALSE | FALSE | NONE | NONE |
| ... | ... | ... | ... | ... | ... | ... | ... | ... | ... | ... |

| ID | SHAPE | CENTER POSITION | | SIZE | | ROTATE | SELECT | ALIGNMENT | PRE-ALIGNMENT POSITION | |
|---|---|---|---|---|---|---|---|---|---|---|
| | | x | y | HORIZONTAL | VERTICAL | | | | x | y |
| IMG0001 | RECTANGLE | 180 | 573 | 106 | 135 | 90 | TRUE | TRUE | 276 | 517 |
| IMG0002 | RECTANGLE | 290 | 573 | 106 | 135 | 90 | TRUE | TRUE | 363 | 573 |
| IMG0003 | RECTANGLE | 400 | 573 | 106 | 135 | 90 | TRUE | TRUE | 390 | 623 |
| IMG0004 | RECTANGLE | 510 | 573 | 106 | 135 | 90 | TRUE | TRUE | 313 | 680 |
| IMG0005 | RECTANGLE | 620 | 700 | 106 | 135 | 90 | TRUE | TRUE | 260 | 593 |
| IMG0006 | RECTANGLE | 730 | 573 | 106 | 135 | 90 | TRUE | FALSE | 229 | 653 |
| IMG0007 | RECTANGLE | 840 | 463 | 106 | 135 | 90 | TRUE | TRUE | 180 | 573 |
| IMG0008 | RECTANGLE | 150 | ... | ... | ... | 175 | FALSE | FALSE | NONE | NONE |
| ... | ... | | | | | | | | | |

2801

801

F I G. 11B

| ID | SHAPE | CENTER POSITION | | SIZE | | ROTATE | SELECT | ALIGNMENT | PRE-ALIGNMENT POSITION | |
|---|---|---|---|---|---|---|---|---|---|---|
| | | x | y | HORIZONTAL | VERTICAL | | | | x | y |
| IMG0001 | RECTANGLE | 276 | 517 | 106 | 135 | 90 | TRUE | FALSE | NONE | NONE |
| IMG0002 | RECTANGLE | 363 | 573 | 106 | 135 | 10 | TRUE | FALSE | NONE | NONE |
| IMG0003 | RECTANGLE | 390 | 623 | 106 | 135 | 3 | TRUE | FALSE | NONE | NONE |
| IMG0004 | RECTANGLE | 313 | 680 | 106 | 135 | 175 | TRUE | FALSE | NONE | NONE |
| IMG0005 | RECTANGLE | 260 | 593 | 106 | 135 | 70 | TRUE | FALSE | NONE | NONE |
| IMG0006 | RECTANGLE | 730 | 700 | 106 | 135 | 90 | TRUE | FALSE | NONE | NONE |
| IMG0007 | RECTANGLE | 180 | 573 | 106 | 135 | 120 | TRUE | FALSE | NONE | NONE |
| IMG0008 | RECTANGLE | 150 | 463 | 106 | 135 | 175 | FALSE | FALSE | NONE | NONE |
| ... | ... | ... | ... | ... | ... | ... | ... | ... | ... | ... |

801

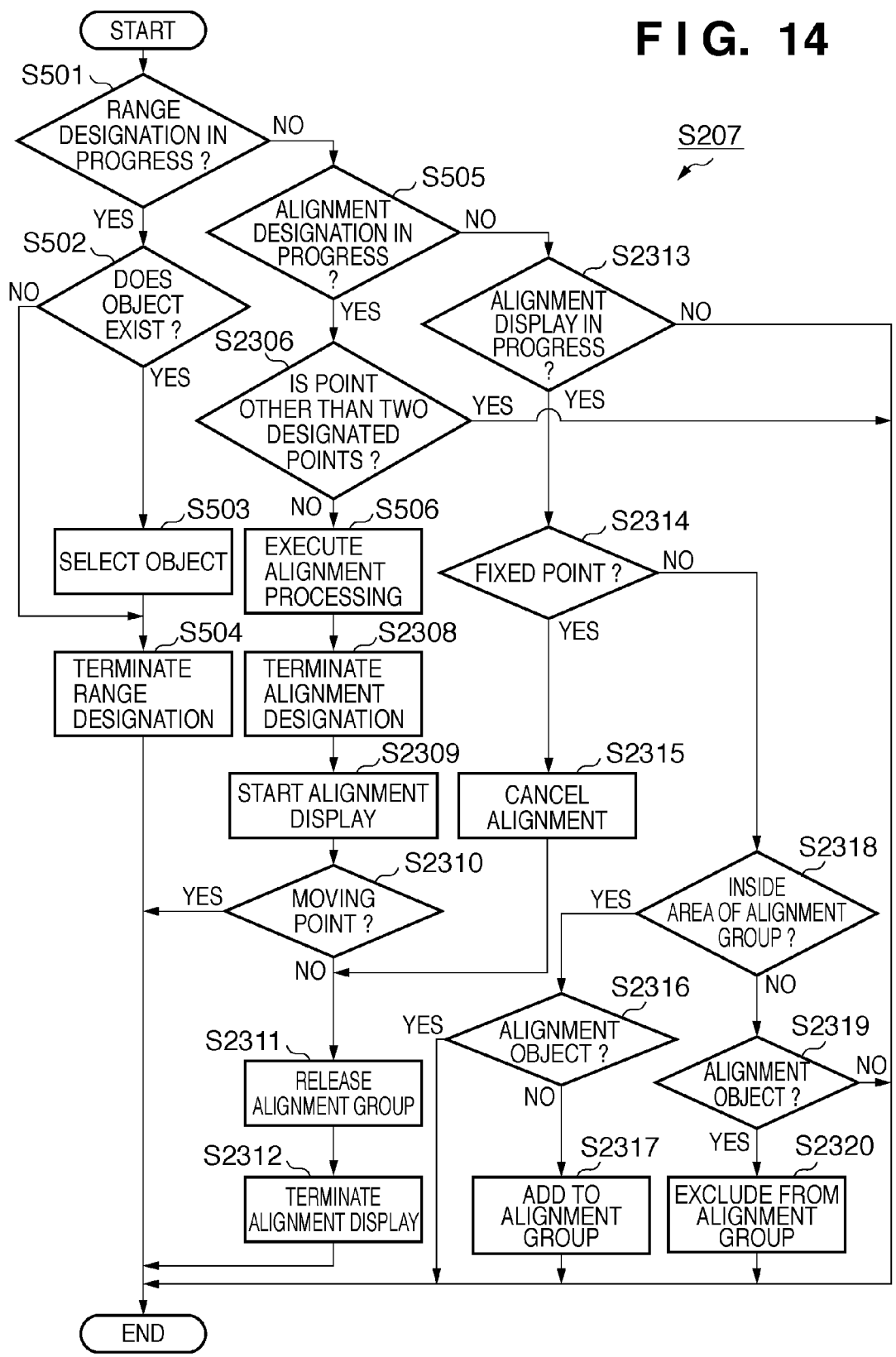
F I G. 14

INFORMATION PROCESSING APPARATUS AND METHOD

BACKGROUND OF THE INVENTION

1. Field of the Invention

The present invention relates to a technique for aligning objects composed of figures, images and characters, and the like.

2. Description of the Related Art

A rendering tool having a function for aligning objects that a user has laid out on content is known in the prior art. A pointing device used when aligning objects is a device such as a mouse, which has only one point for pointing.

Accordingly, in a case where a plurality of objects are aligned, the user first selects the plurality of objects by dragging a mouse and then causes an alignment menu to be displayed by right-clicking the mouse, by way of example.

The user further selects the alignment mode of the desired type from among the items displayed in the menu. Thus, the user follows a series of steps to align the plurality of objects.

Conventionally, a technique using a touch-sensitive panel or the like for allowing a user to designate a plurality of positions by his fingers simultaneously (referred to as "multi-touch") is also known.

Further, a technique for enlarging, reducing and rotating an object based upon a change in distance or a change in angle between two points designated by a finger has been disclosed (e.g., see the specification of Japanese Patent Laid-Open No. 2001-290585).

However, in a case where a plurality objects are aligned by an operation using a pointing device such as a mouse having only one point for pointing, a problem which arises is that the procedure followed by the user is troublesome.

Further, an operation using multi-touch is limited to an operation directed toward only one object.

SUMMARY OF THE INVENTION

The present invention has been devised in view of the foregoing problems and provides an efficient alignment of a plurality of objects. In addition, the present invention improves operability when a plurality of objects are aligned. Furthermore, the present invention provides a sophisticated alignment of a plurality of objects by an intuitive operation.

For example, an information processing apparatus according to the present invention has the structure set forth below.

In one aspect of the present invention, an information processing apparatus includes a display unit configured to display objects, a recognition unit configured to recognize that a plurality of positions on the display unit have been designated, and an alignment unit, wherein in a state in which a first position contained in an area in which a plurality of objects are displayed has been recognized by the recognition unit and a second position on the display unit has been recognized by the recognition unit, the alignment unit is configured to align the plurality of objects on the display unit in accordance with path of movement when movement of the first position or second position has been detected.

In accordance with the present invention, it is possible to align a plurality of objects efficiently. Further, it is possible to improve operability when a plurality of objects are aligned. Further, it is possible to align a plurality objects by an intuitive operation.

Further features of the present invention will become apparent from the following description of exemplary embodiments with reference to the attached drawings.

BRIEF DESCRIPTION OF THE DRAWINGS

FIGS. 3A to 3D are diagrams illustrating examples of data structures of a content management table 43;

FIGS. 11A and 11B are diagrams illustrating examples of data structures of a content management table 43;

FIG. 14 is a flowchart illustrating designation-terminate processing.

DESCRIPTION OF THE EMBODIMENTS

Preferred embodiments of the present invention will be described below in detail. It should be noted that the present invention is not limited to the embodiments below and merely illustrates concrete examples advantageous for working the present invention.

Further, all combinations of features described in the following embodiments are not necessarily essential as means for solving the problems to which the present invention is directed.

First Embodiment

Figure 1A:
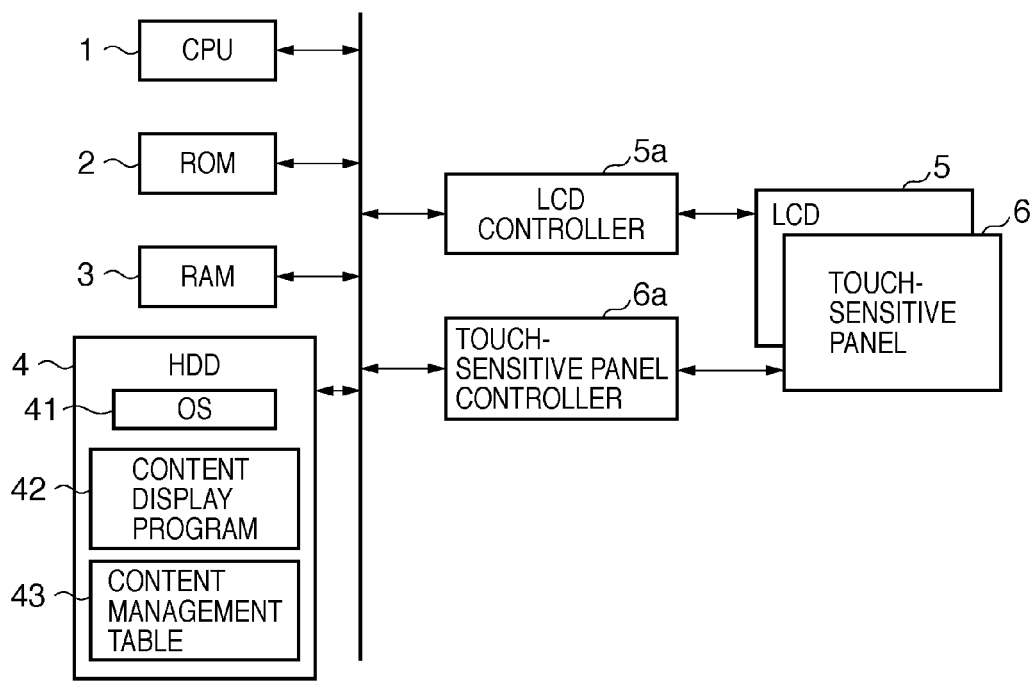
FIGS. 1A and 1B are diagrams illustrating the configuration of an information processing apparatus according to the present invention.

FIG. 1A is a block diagram illustrating the hardware configuration of an information processing apparatus according to this embodiment.

The information processing apparatus includes a CPU 1 for controlling the overall apparatus; a ROM 2 storing a booting program and permanent data; and a RAM 3 that functions as a main memory device.

A hard-disk drive 4 stores an operating system 41, a content display program 42 and a content management table 43.

A liquid crystal display (LCD) 5 is one example of a display unit. Supply of image data to the LCD 5 is performed by an LCD controller 5a. A touch-sensitive panel 6 forming a coordinate input unit is superimposed upon and affixed to the surface of the LCD 5.

Any well-known method such as an ultrasonic method, opto-electronic method or electrostatic capacitance method can be adopted as the method of implementing the touch-sensitive panel.

A controller 6a of the touch-sensitive panel detects the coordinates of a position on the touch-sensitive panel 6 touched by a user and sends the coordinates to the CPU 1 as an interrupt signal. The controller 6a is adapted so as to accept a touch operation performed at least at two locations.

Figure 1B:
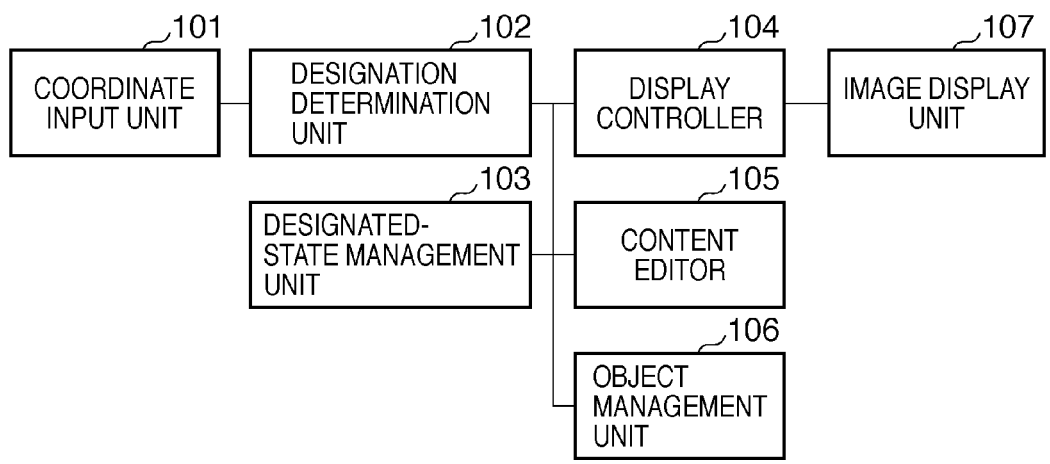

FIG. 1B is a block diagram illustrating the functional configuration of the information processing apparatus according to this embodiment.

The information processing apparatus includes a coordinate input unit 101, a designation determination unit 102, a designated-state management unit 103, a display controller 104, a content editor 105, an object management unit 106 and an image display unit 107.

The coordinate input unit 101 detects start, move and termination of designation of points on the LCD 5. The designation determination unit 102 determines to what kind of designation a coordinate input corresponds. The designated-state management unit 103 manages a designated state decided by a plurality of coordinate inputs.

The display controller 104 extracts and displays a displayable portion of content on which objects are placed. The content editor 105 lays out objects and changes coordinates.

The object management unit 106 manages the state of an object, and the image display unit 107 displays a displayable portion.

An overview of functions capable of being implemented by the information processing apparatus according to this embodiment will be described next.

The content display program 42 in this embodiment is a browser program for browsing content such as photograph files. When the content display program 42 is invoked, a screen of the kind shown in FIG. 2A is displayed on the LCD 5.

It is possible for objects to be sorted and laid out depending upon an attribute such as time of creation. Layout by a move operation performed by the user also is possible and positions of the objects can be grouped together by user operation.

By viewing the screen, the user can approximately ascertain the number of objects in each group. Furthermore, each object may be displayed in the form of a thumbnail image or the like.

Figure 2A:
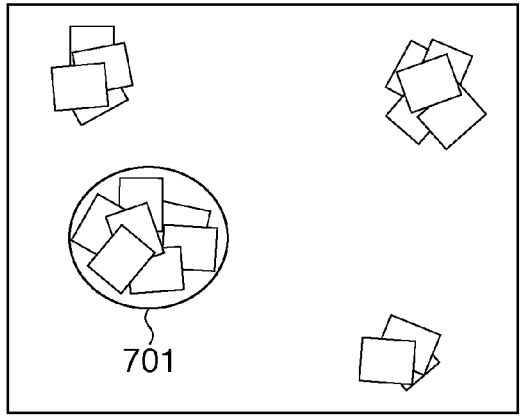
FIGS. 2A to 2F are diagrams illustrating examples of placement of objects on a screen.

FIG. 3A is a diagram illustrating an example of data structure of the content management table 43 when the screen shown in FIG. 2A is being displayed on the LCD 5.

As shown in FIG. 3A, items of data indicating shape, center position, size, rotation, selected state, aligned state and pre-alignment position are stored in the table for every object ID. The display controller 104 refers the content management table 43 to place each object.

The state shown in FIG. 2A is one in which none of the objects have been selected and aligned. Accordingly, items "SELECT" and "ALIGNMENT" of each object are all "FALSE" in the content management table 43.

Specifically, the data structure of the group of objects indicated at 701 in FIG. 2A corresponds to IMG0001 to IMG0007 (indicated at reference numerals 801) in FIG. 3A.

Figure 2D:
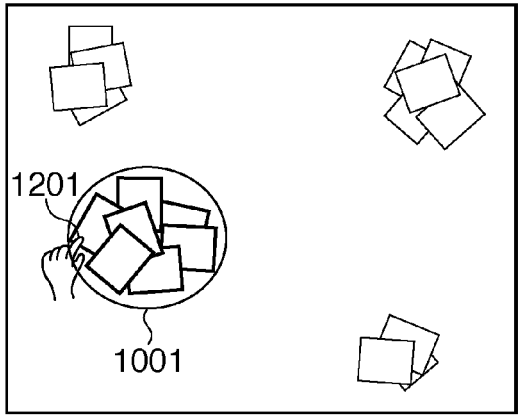
Figure 2B:
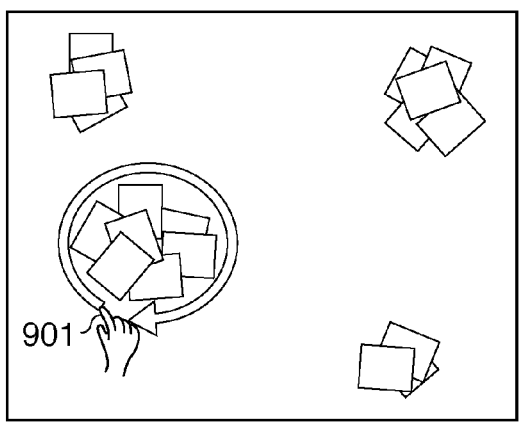

FIG. 2B is a diagram illustrating a situation in which object selection has been carried out by the user pressing the touch-sensitive panel 6 outside the objects with a finger 901 of his right hand and performing a tracing motion so as to surround one or more objects to which processing is to be applied.

Figure 2E:
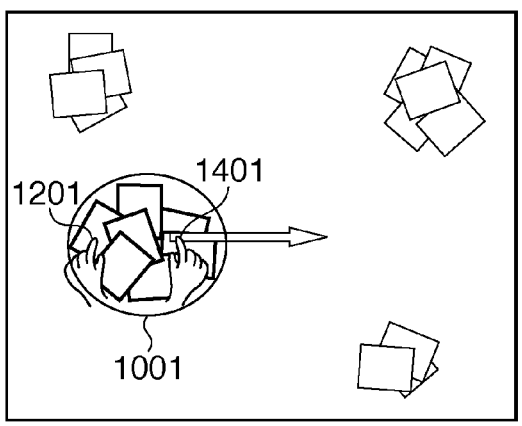
Figure 2C:
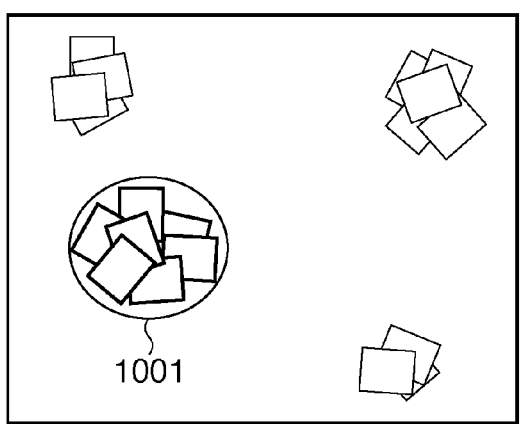

When tracing is finished, each object within the selected group, which is indicated at 1001, is highlighted, as illustrated in FIG. 2C.

If it is assumed that the object IDs of the group 1001 selected at this time are IMG0001 to IMG0007, then the item "SELECT" corresponding to each of IMG0001 to IMG0007 in the content management table 43 changes to "TRUE", as illustrated in FIG. 3B.

FIG. 2D is a diagram illustrating an example in which the user presses a selected object with a finger 1201 of this left hand to thereby designate an alignment group as a single-point designated state. Here, an alignment group means a group of objects that should be aligned.

By merely pressing one object in the selected group, all of the objects in the selected group 1001 can be designated as objects to be aligned.

Now the item "ALIGNMENT" corresponding to each of IMG0001 to IMG0007 in the content management table 43 changes to "TRUE", as shown in FIG. 3C.

From the state shown in FIG. 2D in which the user has pressed a first position corresponding to a selected object with the finger 1201 of his left hand, the user can press a second position corresponding to a selected object and perform a rightward linear tracing motion with a finger 1401 of his right hand, as illustrated in FIG. 2E.

Figure 2F:
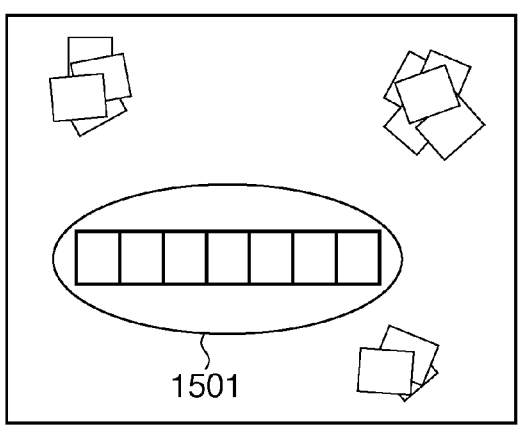

If the user lifts the finger 1201 of his left hand and the finger 1401 of his right hand from the touch-sensitive panel 6 after performing the tracing motion, objects 1501 of interest are aligned and displayed along a horizontal straight line (one-dimensionally) in the direction of tracing motion, as illustrated in FIG. 2F.

Now, as shown in FIG. 3D, the item "CENTER POSITION" corresponding to each of IMG0001 to IMG0007 in the content management table 43 takes on coordinate values for which a linear alignment is achieved.

More specifically, the y coordinates of "CENTER POSITION" of IMG0001 to IMG0007 all take on the same value and the x coordinates take on values that do not overlap one another.

Figure 4A:
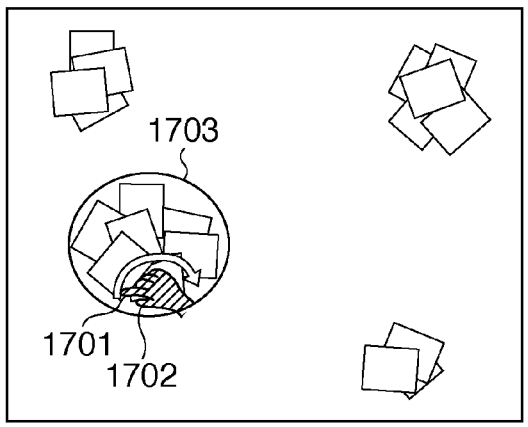
FIGS. 4A to 4D are diagrams illustrating examples of placement of objects on a screen.

Further, as illustrated in FIG. 4A, the user presses a first position corresponding to a selected object at 1703 with the index finger 1701 of his right hand, presses a second position outside the area of the selected object with the thumb 1702 of his right hand, describes an arc with his index finger 1701 and then lifts finger 1701 and thumb 1702.

Figure 4C:
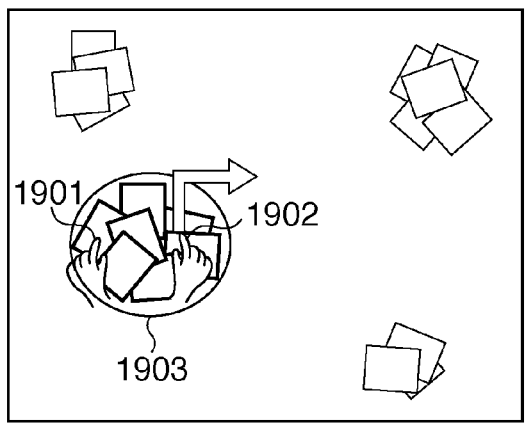
Figure 4B:
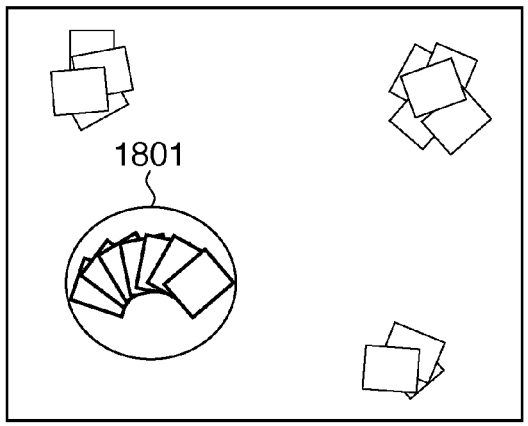

When this is done, the objects of interest are aligned and displayed in the shape of a fan, as indicated at 1801 in FIG. 4B. Although the points to which the finger 1701 is moved in this case are inside the area of the alignment group, the fixed point indicated at 1702 is outside the area of the alignment group.

In this case, the first input position is inside the area of a selected object and the second input position is outside the area of a selected object.

Further, as illustrated in FIG. 4C, the user presses a first point of a selected object with a finger 1901 of his left hand, performs an upwardly directed linear tracing motion with a finger of his right hand, then performs a rightward directed linear tracing motion with the same finger of his right hand while continuing to press the end point and then lifts the fingers 1901 and 1902.

That is, this is a case where a position pressed by a finger is first moved linearly along a specific direction and then is moved linearly along a direction having an approximate right-angle relationship with respect to the specific direction. It should be noted that the approximate right angle refers to an angle that approximates a right angle.

Figure 4D:
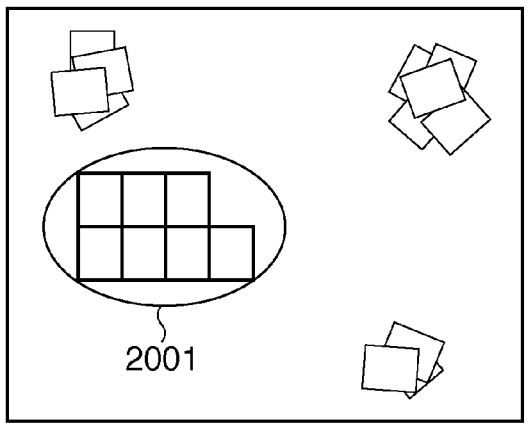

When this is done, the objects of interest are aligned in the form of a matrix (two-dimensionally), as indicated at 2001 in FIG. 4D. That is, in a case where the path of the points of movement describes lines at a right angle, the objects are aligned in multiple rows and multiple columns (two-dimensionally).

It should be noted that FIG. 4D adopts an alignment method in which the aspect ratio is the smallest and the centroid is placed at whichever of the horizontal and vertical dimensions is near the fulcrum position. However, this does not impose any limitation upon the invention.

For example, objects may be aligned in the form of a matrix in conformity with the aspect ratio of a right-angle path traced by the user. That is, if a right-angle path in which the vertical dimension is long and the horizontal dimension is short is traced, then the objects will be aligned in the form of a matrix that is long in the vertical direction.

Further, in a case where the length of the path in the vertical direction corresponds to two objects and the length of the path in the horizontal direction corresponds to four objects, then the objects will be aligned in the form of two rows vertically and four columns horizontally.

Further, the type of alignment that can be realized by executing the content display program 42 using the information processing apparatus of this embodiment is not limited to the linear, arcuate and right-angle alignments described above.

For example, in a case where the path traced takes on various shapes such as that of a circle or spiral, it may be so arranged that the objects will be aligned in conformity with this path.

Figure 5:
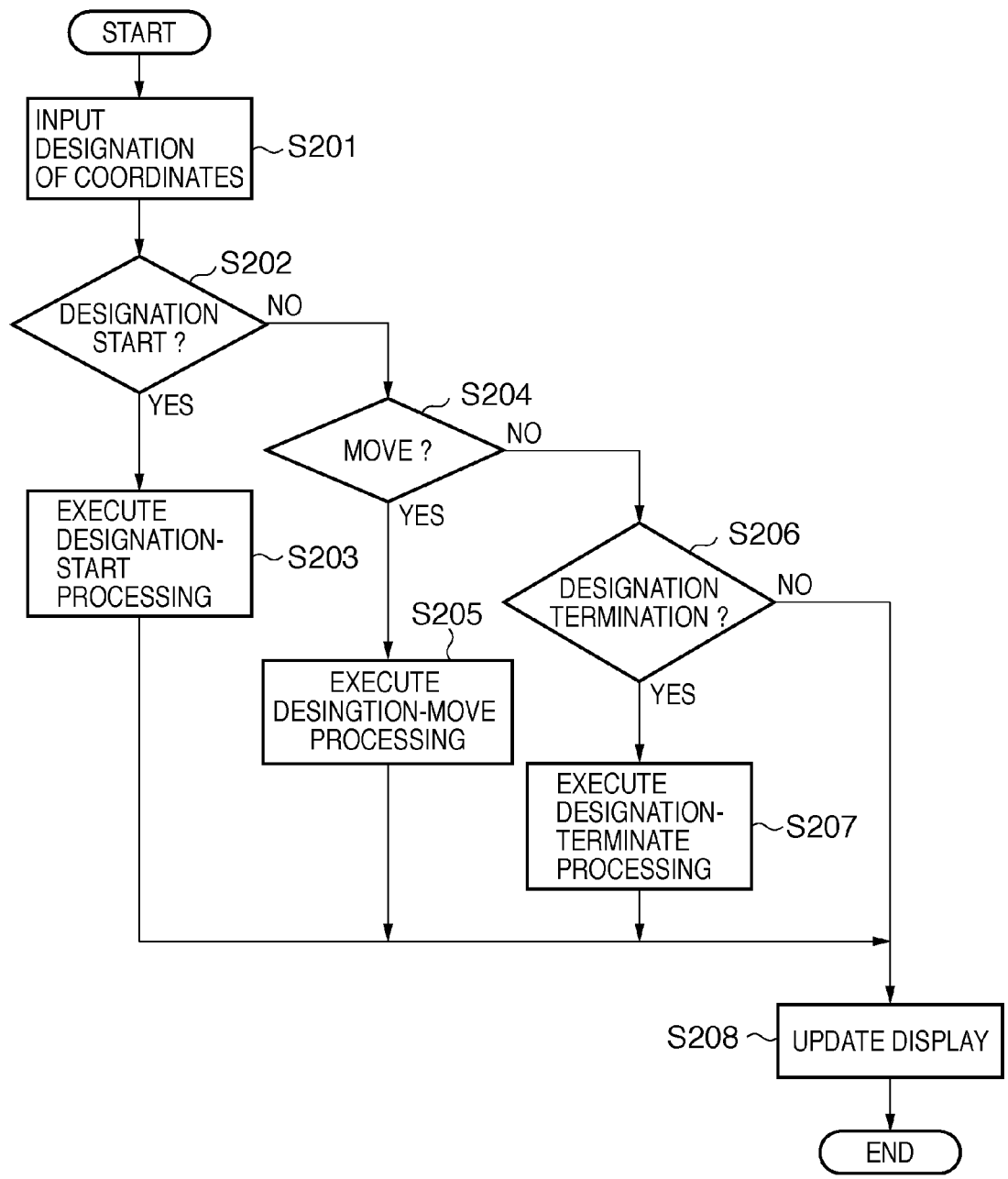
FIG. 5 is a flowchart illustrating display control processing.

Processing for implementing the functions set forth above will now be described in detail. FIG. 5 is a flowchart illustrating display control processing executed by the information processing apparatus according to this embodiment.

This processing involves accepting an input from the coordinate input unit 101, executing processing corresponding to this input and updating the display. This processing is repeated as long as there is no halt instruction.

The program corresponding to this flowchart is included in the content display program 42, loaded in the RAM 3 and executed by the CPU 1.

First, the designation determination unit 102 accepts an input from the coordinate input unit 101 at step S201 and then determines whether the input is start of a designation. For example, if any point on the touch-sensitive panel 6 is pressed, this would correspond to the start of a designation.

If it is determined in step S202 that a designation has started, then the processing of step S203 is executed, designation-start processing, described later, is executed, and then the processing of step S208 is executed.

If it is determined in step S202 that a designation has not started, then the processing of step S204 is executed and the designation determination unit 102 determines whether the input is designation-move. "Designation-move" is determined by detecting that a designated point already exists and that this point is moving.

For example, performing tracing motion on the touch-sensitive panel 6 shown in FIG. 2B corresponds to "designation-move". If designation-move is determined in step S204, then designation-move processing, described later, is executed in step S205 and this is followed by execution of processing of step S208.

If it is determined in step S204 that motion has not occurred, on the other hand, then the designation determination unit 102 determines in step S206 whether termination of a designation has occurred. Termination of designation corresponds to removal of finger pressure from a point on the touch-sensitive panel 6.

If it is determined in step S206 that designation has been terminated, then designation-terminate processing, described later, is executed in step S207, after which the processing of step S208 is executed.

If it is determined in step S206 that designation has not been terminated, then the processing of step S208 is executed.

In step S208, the display controller 104 creates an image at the required location, re-displays an image and updates the display, etc.

It should be noted that this processing accepts designation of a plurality of points simultaneously. By processing the start, move and the termination of a designation as separate points, it is possible, from pressing of a certain point until termination of this operation, to process the pressing of another point.

If a plurality of input positions has been recognized simultaneously, the input positions are queued and processed one at a time.

Figure 6:
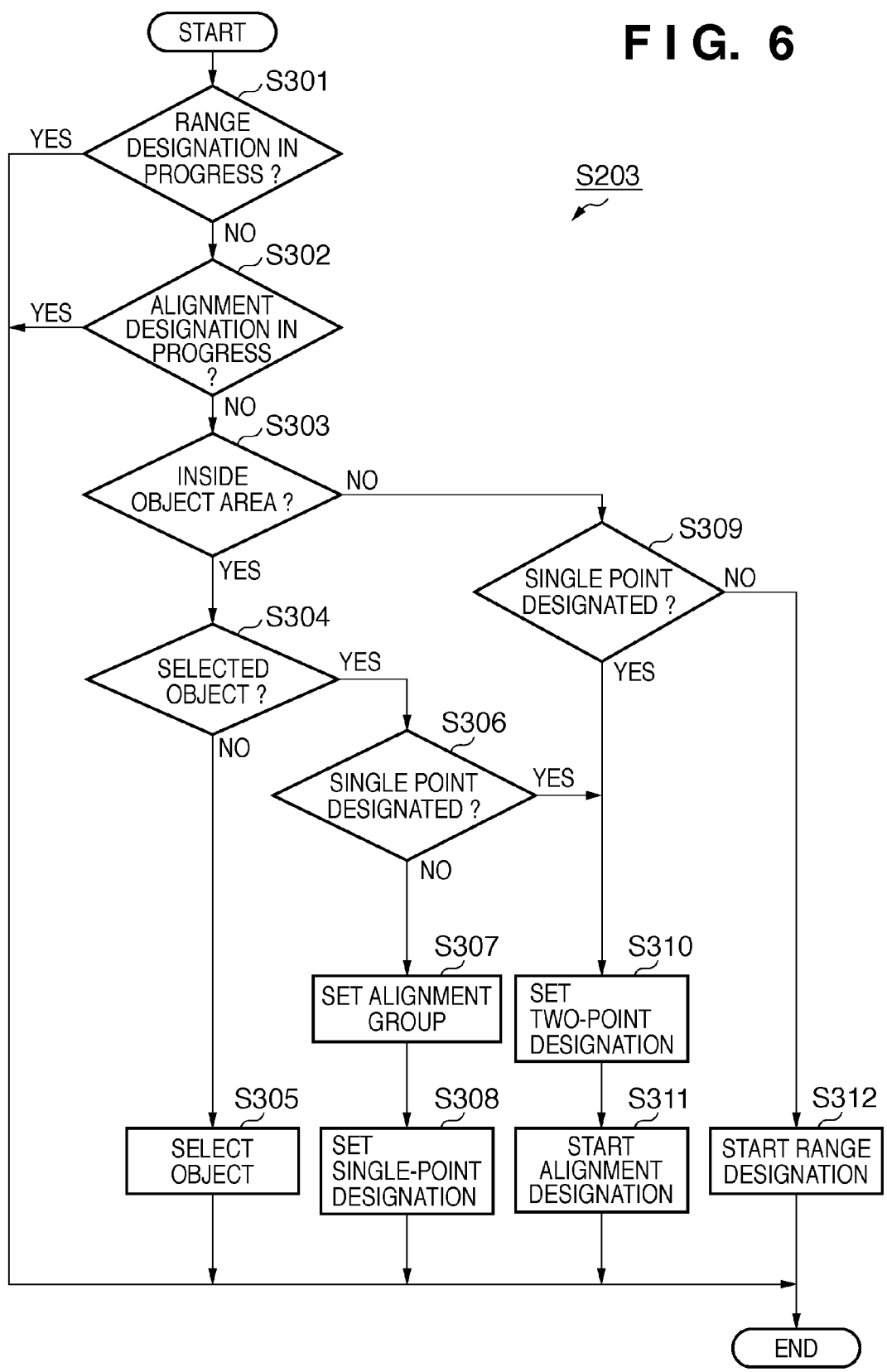
FIG. 6 is a flowchart illustrating designation-start processing.

FIG. 6 is a flowchart illustrating designation-start processing executed in step S203.

First, in step S301, the designation determination unit 102 determines whether range designation is in progress. If a range is currently being designated, processing is exited. The reason for this is to prevent another object that has not been designated from being selected inadvertently during range designation.

If it is determined in step S301 that designation of a range is not in progress, then, in step S302, the designation determination unit 102 determines whether alignment designation is in progress. If alignment designation is in progress, processing is exited. The reason for this is also to prevent an object that has not been designated from being selected inadvertently processed.

If it is determined in step S302 that alignment designation is not in progress, then, in step S303, the designation determination unit 102 determines whether the designated point lies inside an object area. If it is determined in step S303 that the designated point lies within an object area, then the processing of step S304 is executed.

On the other hand, if it is determined at step S303 that the designated point lies outside an object area, then the processing of step S309 is executed.

In step S304, the designation determination unit 102 determines whether there is a selected object at the designated coordinates.

If it is determined that there is no selected object at the designated coordinates, then the designated-state management unit 103 selects an object at the designated coordinates at step S305 and ends this series of processing operations.

On the other hand, if it is determined in step S304 that there is a selected object at the designated coordinates, then, in step S306, the designated-state management unit 103 determines whether there has already been selection of a selected object at one point and continuation of operation (i.e., whether a single point has been designated or not).

This corresponds to a determination as to whether, with a selected object in the process of being pressed on the touch-sensitive panel 6, a selected object at another single point has been pressed or not.

If it is determined at step S306 that there has not been designation of a single point, that is, that the present designation is the first designation of a single point (which corresponds to pressing of the selected object with the finger 1201 of the left hand in the example of FIG. 2E), then the processing of step S307 is executed.

In step S307, the object management unit 106 places the selected object at the designated coordinates in an alignment state and sets a group of objects that are to be aligned, that is, an alignment group.

It should be noted that selected objects whose areas serially overlap an object designated at a single point also attain the alignment state in a similar manner. That is, even objects not directly at the designated coordinates are included in the alignment group.

Next, in step S308, the object management unit 106 sets the single-point designated state and ends processing.

If it is determined in step S303 that the designated point is outside the object area, then, in step S309, the designated-state management unit 103 determines whether this is a single-point designated state.

This corresponds to a determination as to whether an alignment group has already been pressed at a single point and, moreover, a portion outside the object area, that is, a background portion, has been pressed at one more point. If it is determined in step S309 that a single point has been designated, then the processing of step S310 is executed.

If single-point designation has been determined in step S306, then the designated-state management unit 103 sets two-point designation in step S310.

In case of the path from step S306 to step S310, the designations of the two points are both on the alignment group. In case of the path from step S309 to step S310, one point is on the alignment group and one point is on the background.

When the processing of step S310 is executed, the object management unit 106 next executes step S311, that is, starts alignment designation and then ends this series of processing operations. It should be noted that the alignment designation state continues until the designation is terminated.

This corresponds to the case where the second point is designated by the finger 1401 in FIG. 2E, the case where the second point is designated by the thumb 1702 in FIG. 4A and the case where the second point is designated by the finger 1902 in FIG. 4C.

On the other hand, if it is determined in step S309 that this is not the single-point designated state, then, in step S312, the object management unit 106 starts range designation and then ends processing.

This is the start of range designation for selecting a plurality of objects by tracing the background portion. The range designation state continues until such designation is terminated. This corresponds to pressing the background with the finger 901 in FIG. 2B.

Figure 7:
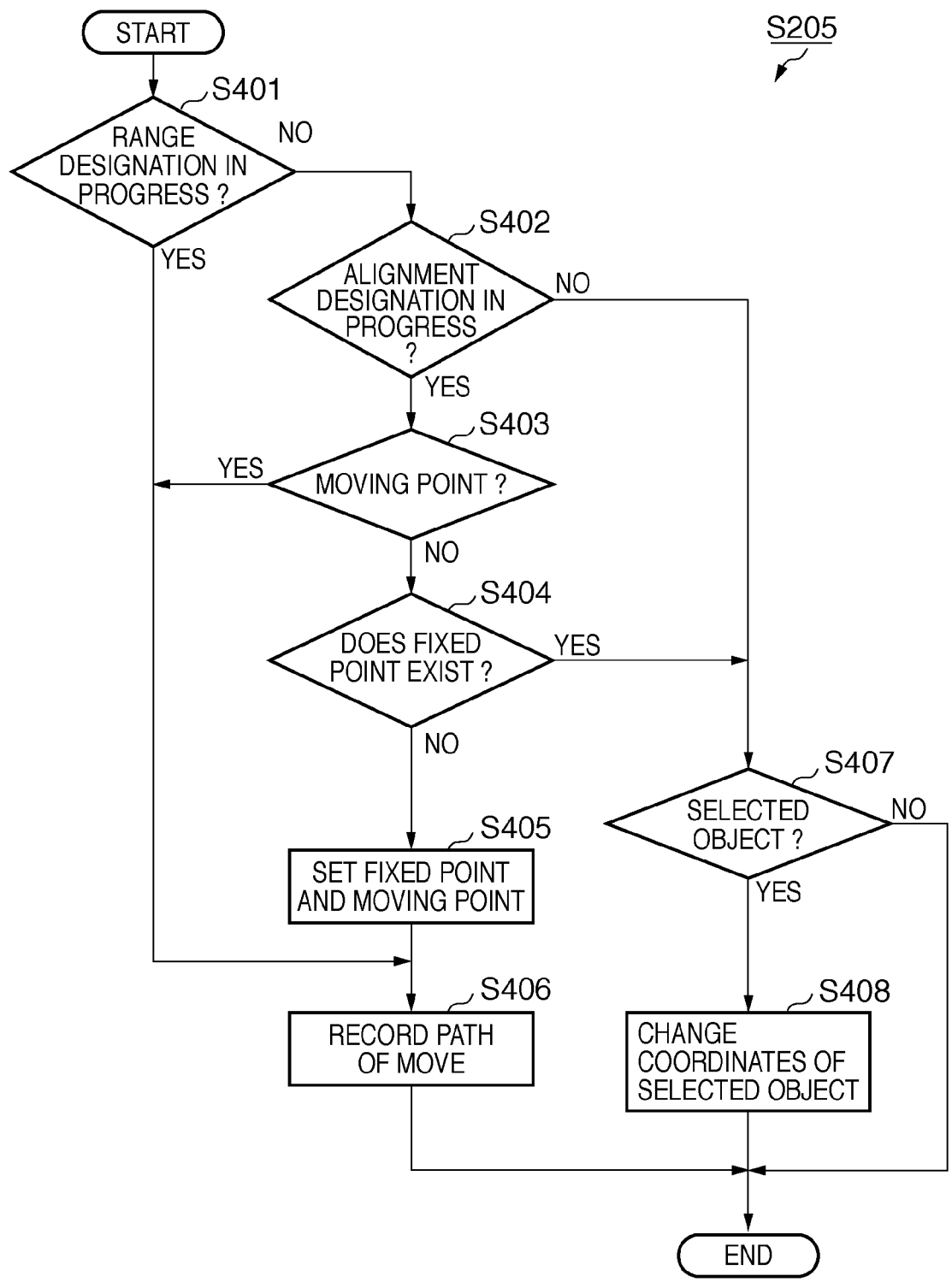
FIG. 7 is a flowchart illustrating designation-move processing.

FIG. 7 is a flowchart illustrating designation-move processing in step S205.

In step S401, the object management unit 106 determines whether a range is currently being designated. If range designation is in progress, then the designation determination unit 102 records the path of move in step S406 and ends this series of processing operations.

On the other hand, if it is determined in step S401 that range designation is not in progress, then, in step S402, the designated-state management unit 103 determines whether alignment designation is in progress. If alignment designation is in progress, then, in step S403, the designation determination unit 102 determines whether the designated coordinates represent a moving point. The setting of a moving point and fixed point is performed as follows: Initial move following the setting of two-point designation is detected. If after this detection the move is to either of the two points, then the moving point and the fixed point are set in step S405.

If it is determined in step S403 that the designated coordinates represent a moving point, then the designated-state management unit 103 records the path of move in step S406 and ends this series of processing operation.

On the other hand, if it is determined in step S403 that the designated coordinates do not represent a moving point, then, in step S404, the designated-state management unit 103 determines whether there is a fixed point. This is a determination as to whether the state is one in which a fixed point and moving point have not yet been set.

If there is no fixed point, then the designated-state management unit 103 sets a fixed point and a moving point in step S405. Of the two points for which the two-point designation has been set, a point at which move has been sensed is adopted as a moving point and the other point is adopted as a fixed point.

Next, in step S406, the designated-state management unit 103 records the path of move and ends this series of processing operation.

On the other hand, if it is determined in step S402 that alignment designation is not in progress or if it is determined in step S404 that there is a fixed point, then, in step S407, the object management unit 106 determines whether what is at the moving point is a selected object.

If a selected object is at the moving point, then, in step S408, the object management unit 106 changes the coordinates in such a manner that the selected object will move and then ends this series of processing operations.

Traversal of this path by reason of the fact that a fixed point is found to exist in step S404 means that the fixed point has moved and that the selected object at the fixed point has been dragged.

Further, if it is determined in step S407 that there is no selected object at the moving point, then this series of processing operations is exited without any action being taken.

It should be noted that this designation-move processing is repeated from start to end of move.

Figure 8:
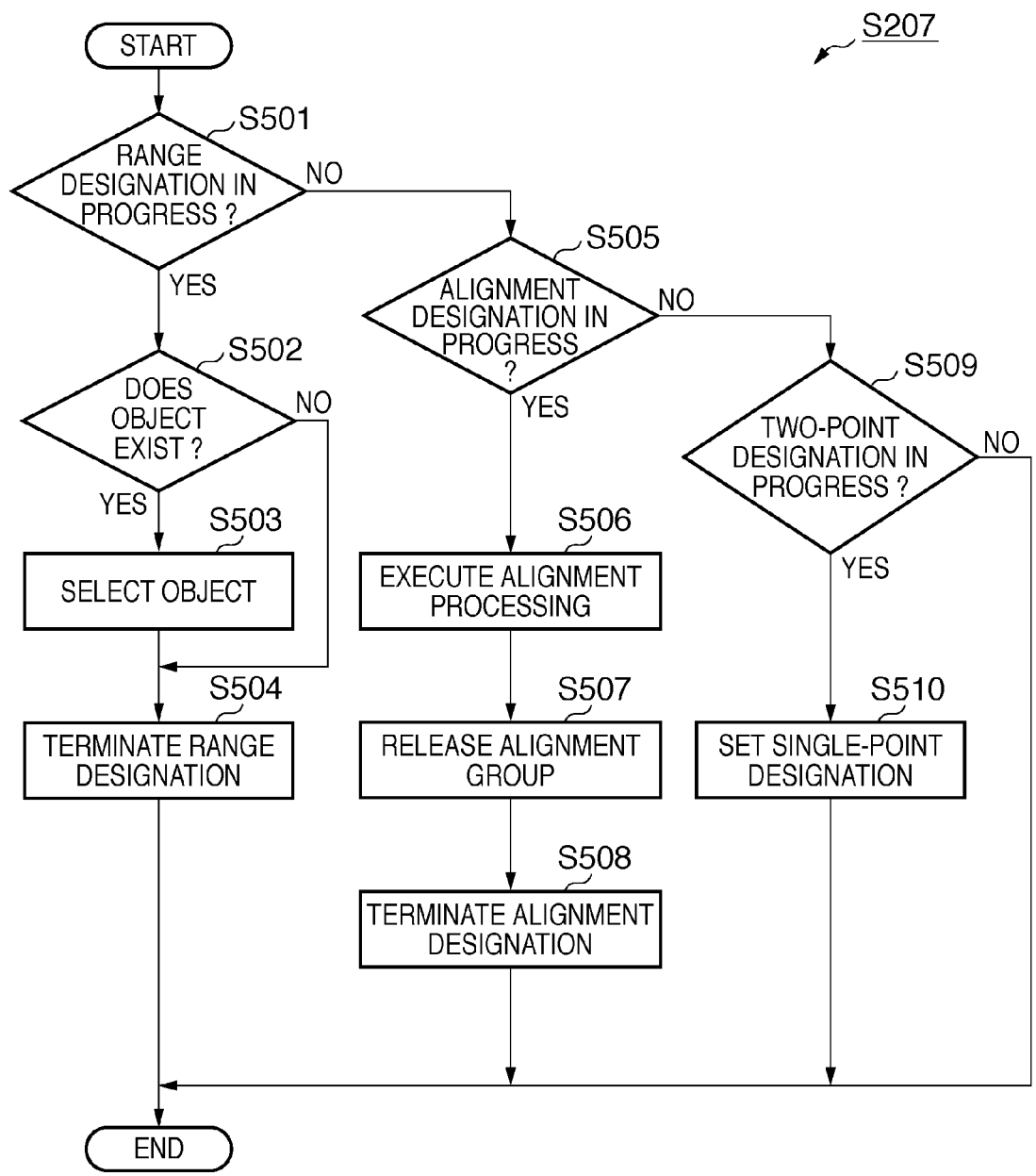
FIG. 8 is a flowchart illustrating designation-terminate processing.

FIG. 8 is a flowchart illustrating the designation-terminate processing of step S207.

In step S501, the designated-state management unit 103 determines whether range designation is in progress. If range designation is in progress, then, in step S502, the object management unit 106 determines whether an object exists in the designated range.

If an object exists in the designated range, then the object management unit 106 selects the object in step S503 and executes the processing of step S504. If an object does not exist in the designated range, on the other hand, then the object management unit 106 executes the processing of step S504 directly.

In step S504, the designated-state management unit 103 terminates the range designation and ends this series of processing operations. This corresponds to the finger 901 of the right hand being lifted from the touch-sensitive panel 6 after it has finished tracing a circle around the objects in FIG. 2B, thereby establishing the state in which the group 1001 has been selected in FIG. 2C.

On the other hand, if it is determined in step S501 that range designation is not in progress, then, in step S505, the designated-state management unit 103 determines whether alignment designation is in progress. This corresponds to a determination as to whether the moving point has been moved in the two-point designation state and finger pressure has been removed from one point.

If alignment designation is in progress, then, in step S506, the content editor 105 executes alignment processing. Alignment processing will be described later with reference to FIG. 9.

After the alignment processing at step S506, the object management unit 106 releases the alignment group in step S507 and the designated-state management unit 103 terminates the alignment designation at step S508 and ends this series of processing operations.

By virtue of the above-described processing, the state of the display on the screen attains the states of the displays shown in FIGS. 2F, 4B and 4D that prevail after the objects are aligned.

On the other hand, if it is determined in step S505 that alignment designation is not in progress, then, in step S509, the designated-state management unit 103 determines whether two-point designation is in progress. This corresponds to a determination as to whether, following designation of two points, finger pressure at one point has been removed without an alignment designation being made.

If two-point designation is in progress, the designated-state management unit 103 performs a single-point designation setting and ends this series of processing operations.

Since the flow returns to the single-point designation at this time, a state is attained in which the next two-point designation will be accepted. That is, of the designation of two points, it is possible to re-designate one of them.

If it is determined in step S509 that two-point designation is not in progress, then this series of processing operations is exited. It should be noted that a method of releasing an object that is in the selected state has not been mentioned here. Such a method will be described later.

Figure 9:
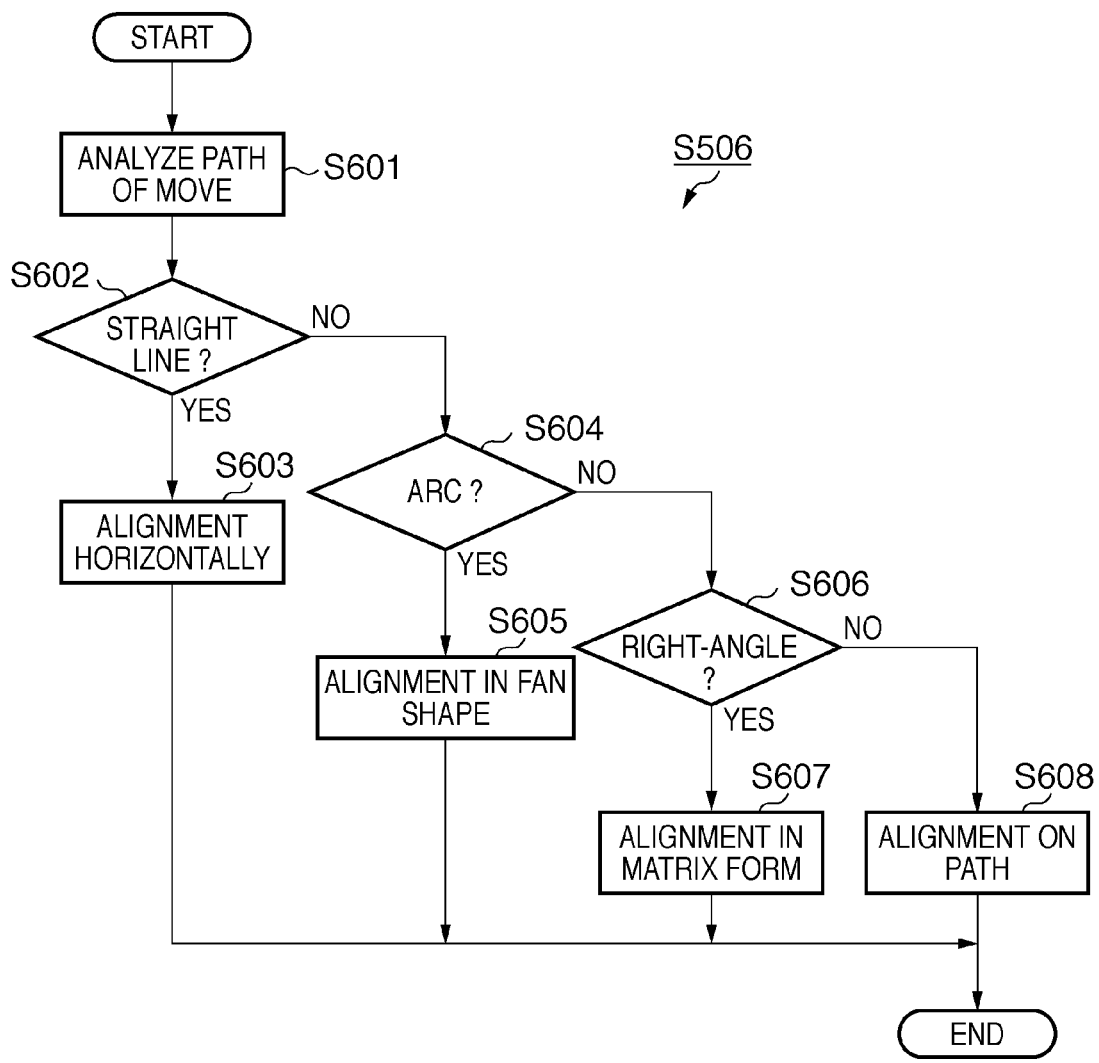
FIG. 9 is a flowchart illustrating alignment processing.

FIG. 9 is a flowchart illustrating the alignment processing of step S506.

First, in step S601, the designation determination unit 102 analyzes the path of move. Next, if it is determined in step S602 that the path is a straight line a shown in FIG. 2E, then the processing of step S603 is executed.

In step S603, the display controller 104 and content editor 105 align the alignment group in the horizontal direction with the fixed point serving as the fulcrum, as illustrated at 1501 in FIG. 2F, and then end processing.

On the other hand, if it is determined in step S602 that the path is not a straight line, then, in step S604, the designation determination unit 102 determines whether the path is an arc of the kind indicated by the path at 1701 in FIG. 4A.

If it is determined in step S604 that the path is an arc, then, in step S605, the display controller 104 and content editor 105 align the alignment group in the shape of a fan in such a manner that the fixed point becomes the pivot of the fan (see 1801 in FIG. 4B). Processing is then exited.

If it is determined in step S604 that the path is not an arc, then, in step S606, the designation determination unit 102 determines whether the path is a right-angle line of the kind indicated by the path at 1902 in FIG. 4C.

If it is determined in step S606 that the path is a right-angle line, then, in step S607, the display controller 104 and content editor 105 align the objects in the form of a matrix (see 2001 in FIG. 4D). Processing is then exited.

On the other hand, if it is determined in step S606 that the path is not a right-angle line, then, in step S608, the display controller 104 and content editor 105 place the alignment group on the path. Processing is then exited.

The following is conceivable as one example of means for judging the shape of the path. First, the straight line from the starting point to the end point is found. If the accumulation of distances between this line and the path is smaller than an arbitrary value, then it is decided that the path is a straight line.

If the accumulation of deviations in distance between a first point and a second point during move is less than an arbitrary value, then it is decided that the path is an arc. The two equal sides of an isosceles triangle the base of which is a straight line between the starting and end points and the apex of which is 90° are found, and if the accumulation of distances between these two sides and the path is less than an arbitrary value, then it is decided that the path defines a right angle.

Further, in the means for judging the shape of a path, the order in which straight line, arc and key are judged may be changed, or it may be so arranged that whichever has the smallest cumulative distance is selected rather than making the judgment in regular order.

Further, the degree of similarity with the shape of the path may be found using another shape approximation method, and whichever shape is most similar may be applied. Methods of approximating the traces of a wide variety of handwriting to geometrical shapes already exist and need not be described here.

Further, information concerning an alignment designation may be stored beforehand so as to make it easy to approximate shapes that are often utilized and the order may be changed so as to give precedence to determination of shapes often utilized. Weighting may be applied to computation of degree of similarity.

Second Embodiment

Described in the first embodiment is processing for aligning objects when finger pressure is removed from one point of either of two designated points. However, it may be so arranged that the original state is restored after objects have been aligned.

For example, objects may be aligned when finger pressure is removed from a moving point of two designated points, and the time during which the fixed point is being pressed may be when the alignment display is in progress.

It may be so arranged that when an object that the user wishes to exclude from an object group after it has been aligned is selected at one point that is not the above-mentioned fixed point, the object is then excluded from the group and finger pressure is removed from the fixed point, the objects of the alignment group with the exception of the selected object are restored to the alignment state.

In this case, the objects are aligned when the fixed point is released from finger pressure while the moving point is being pressed. However, it may be so arranged that the state that prevailed prior to the alignment of the objects is restored. Further, an object other than one in the alignment group may be selected at one more point while the alignment display is in progress, and this object may be dragged into the alignment group to add it to the alignment group.

Reference will now be had to the drawings to describe an example of operation for excluding an object currently being displayed in an alignment from objects that are to be aligned.

Figure 10A:
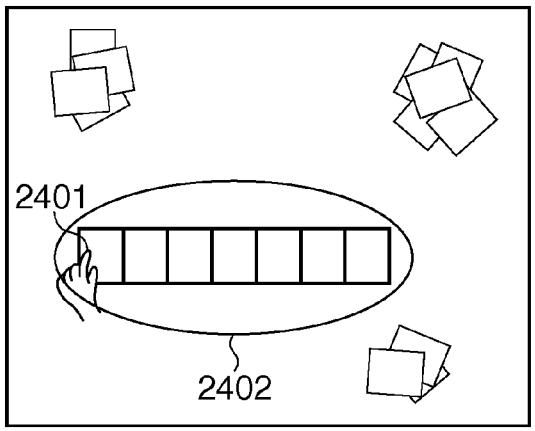
FIGS. 10A to 10E are diagrams illustrating examples of placement of objects on a screen.

FIG. 10A illustrates an example of display immediately after finger pressure is removed from a moving point while a fixed point continues to be pressed by a finger 2401 of the left hand, resulting in an alignment of the kind indicated at 2402.

Figure 10D:
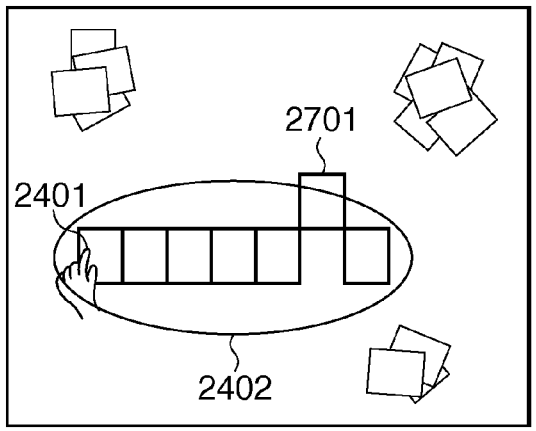
Figure 10B:
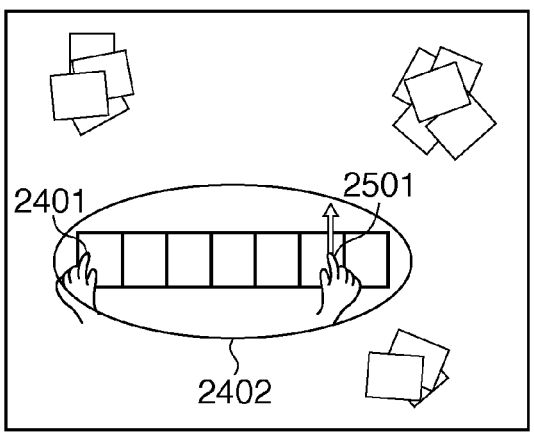
Figure 10E:
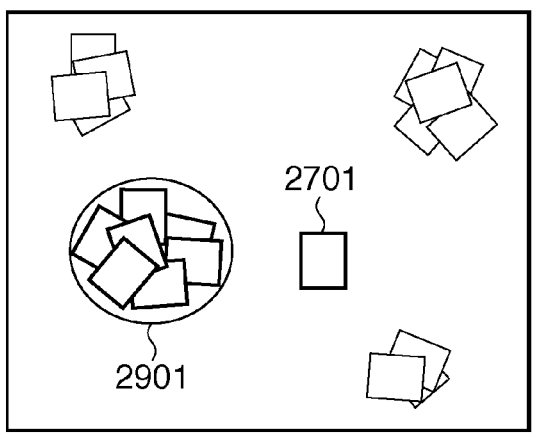
Figure 10C:
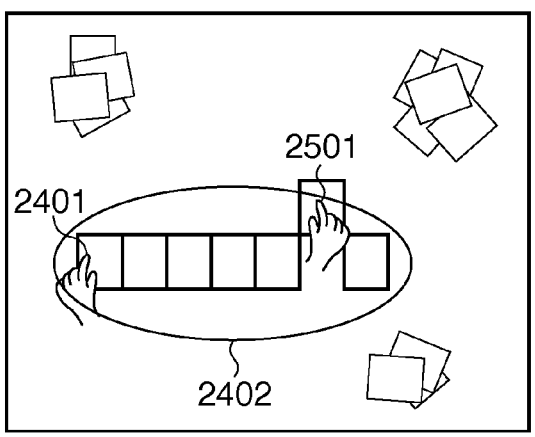

Starting from the state shown in FIG. 10A, one object in the alignment group 2402 is selected by a finger 2501 of the right hand, as illustrated in FIG. 10B, the object is dragged upward, as shown in FIG. 10C, and the finger 2501 of the right hand is removed. When this is done, object 2701 is excluded from the alignment group, as shown in FIG. 10D.

It should be noted that the object that was made the target of exclusion corresponds to IMG0006 shown in FIG. 11A and that the status of "ALIGNMENT" of in the content management table 43 is changed to "FALSE", as indicated at 2801 in FIG. 11A.

Next, if the stationary finger of the left hand is removed, the objects other than the object 2701 that was excluded by the dragging operation return to a position 2901 that prevailed before the objects were aligned, as illustrated in FIG. 10E. This state is similar to that of FIG. 2C except for the fact that the above-mentioned object has been excluded.

That is, the contents of the content management table 43 at this time is the same as that shown in FIG. 3B with the exception of IMG0006, as illustrated in FIG. 11B.

The function implemented by this embodiment in addition to the functions of the first embodiment is as described above. The processing for implementing this function will now be described in detail with reference to flowcharts.

The flow of overall display control processing in this embodiment is similar to that shown in the flowchart of FIG. 5. Designation start, move and termination of designation in this embodiment will be described below.

Figure 12:
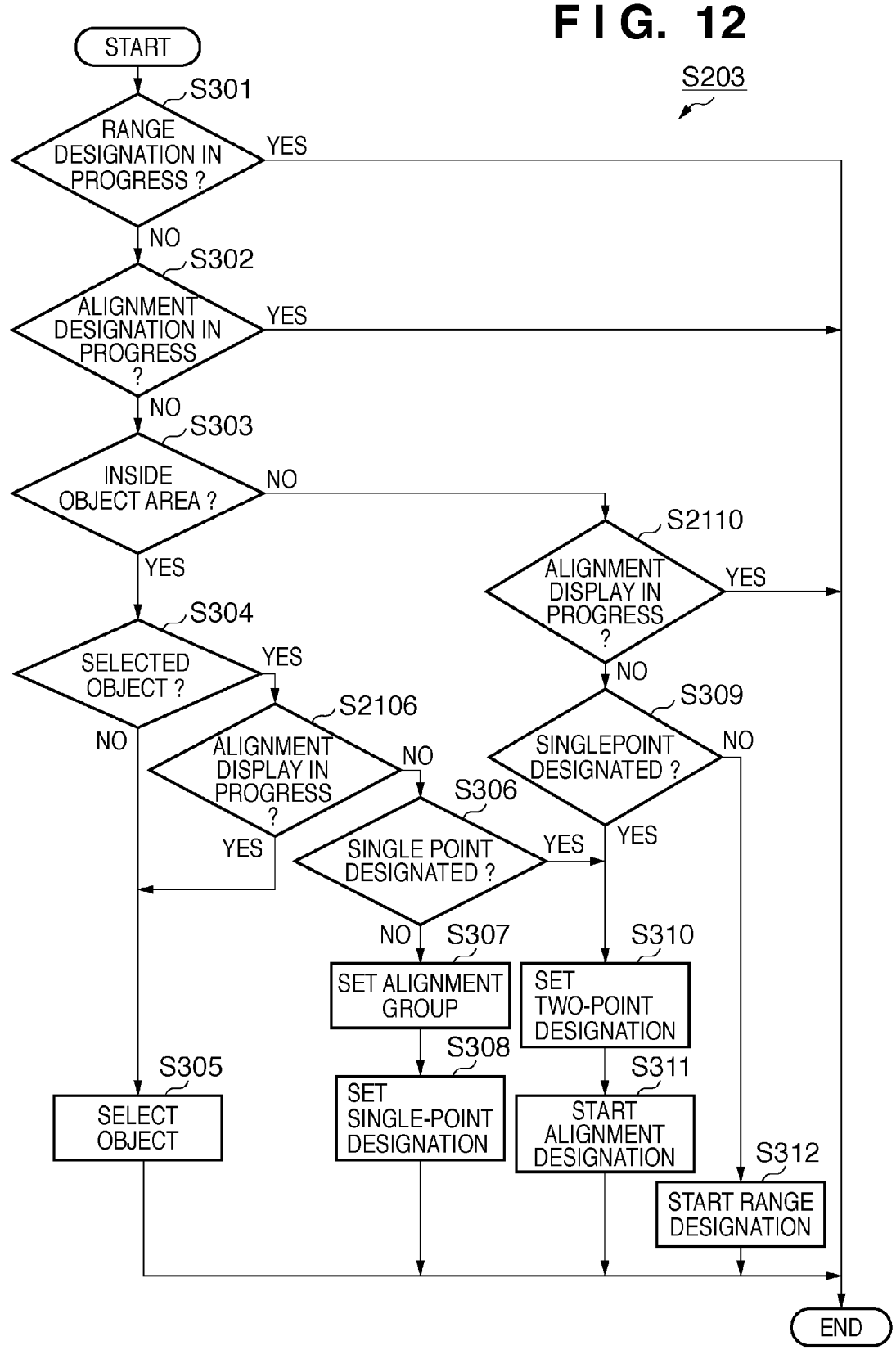
FIG. 12 is a flowchart illustrating designation-start processing.

FIG. 12 is a flowchart illustrating designation-start processing of this embodiment executed in step S203.

This flowchart differs from that of FIG. 6 in that steps S2106 and S2110 for determining whether an alignment display is in progress are inserted between steps S304 and S306 and between steps S303 and S309, respectively.

If it is determined in step S304 that there is a selected object at the designated coordinates, then the object management unit 106 determines in step S2106 whether the alignment display is in progress. If it is determined in step S2106 that the alignment display is in progress, then the processing of step S305 is executed.

On the other hand, if it is determined in step SS2106 that the alignment display is not in progress, then the processing of step S306 is executed. In step S305, the object management unit 106 selects an object that is already in the selected state.

This corresponds to processing executed when an object in an alignment group is selected to be excluded from the group. For example, it corresponds to the case where the finger 2501 of the right hand in FIG. 10B designated an object.

Further, if it is determined in step S303 that the designated point lies outside an object area, then the object management unit 106 determines in step S2110 whether the alignment display is in progress.

If it is determined in step S2110 that the alignment display is in progress, then processing is exited. If the alignment display is not in progress, the processing of step S310 is executed.

Figure 13:
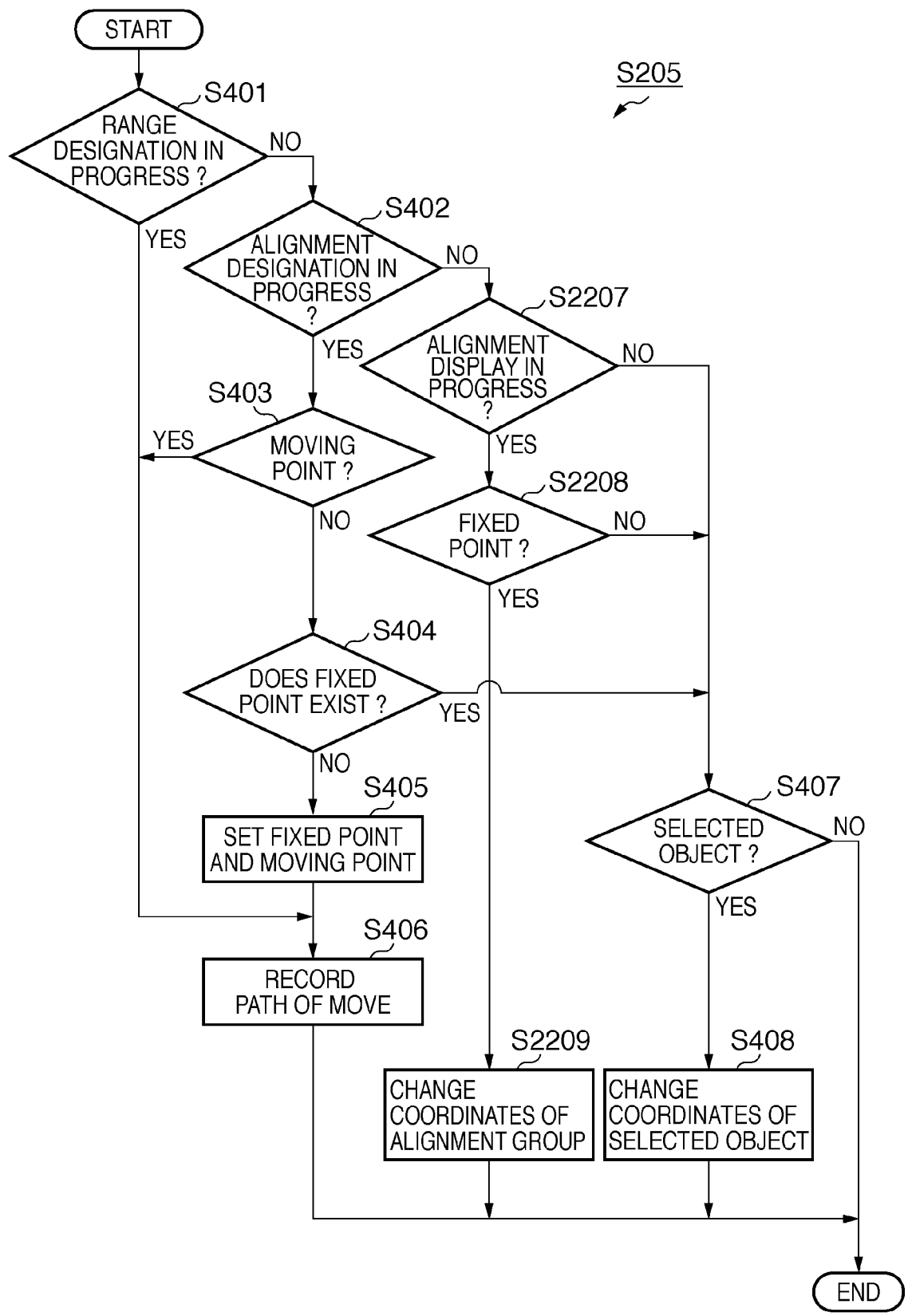
FIG. 13 is a flowchart illustrating designation-move processing.

FIG. 13 is a flowchart illustrating move processing of this embodiment executed in step S205.

This flowchart differs from that of FIG. 7 in that steps S2207, S2208 and S2209 are inserted between steps S402 and S407.

The object management unit 106 determines whether alignment designation is in progress in step S402 and executes the processing of step S403 if alignment designation is in progress. If alignment designation is not in progress, on the other hand, then the object management unit 106 executes the processing of step S2207.

In step S2207, the object management unit 106 determines whether the alignment display is in progress. "Alignment display in progress" refers to a state in which an alignment designation is made, finger pressure is removed from a moving point while designation of the fixed point remains in effect and a temporary alignment state is displayed.

If it is determined in step S2207 that the alignment display is in progress, then, in step S2208, the designation determination unit 102 determines whether the designated coordinates represent a fixed point.

If it is determined that the designated coordinates are a fixed point, then, in step S2209, the object management unit 106 changes the coordinates in such a manner that the entire alignment group moves. Processing is then exited.

On the other hand, if it is determined in step S2207 that the alignment display is not in progress, or if it is determined in step S2208 that the designated coordinates are not a fixed point, or if it is determined in step S404 that a fixed point exists, then the processing of step S407 is executed.

Further, if it is determined that the designated coordinates are not in that of a selected object, processing is exited without any action being taken. If a fixed point is that of a selected object, then the object management unit 106 changes the coordinates of the selected object in step S408.

This permits range designation or the dragging of an object other than a moving point for designating alignment. It should be noted that this corresponds to movement of an object attendant upon movement of the finger 2501 of the right hand in the example of FIG. 10C.

FIG. 14 is a flowchart illustrating designation-terminate processing of this embodiment executed in step S207.

The flowchart of FIG. 14 differs from that of FIG. 8 in terms of the processing that follows the determination in step S505 as to whether the alignment designation is in progress.

If it is determined in step S501 that range designation is not in progress, then it is determined in step S505 whether alignment designation is in progress. If alignment designation is in progress, then, in step S2306, the designated-state management unit 103 determines whether a point from which finger pressure has been removed is a point other than the two designated points.

If it is determined in step S2306 that finger pressure has been removed from coordinates other than those of the two designated points, then processing is exited with no action being taken.

On the other hand, if it is determined in step S2306 that the point is either one of the two designated points, then the alignment processing shown in FIG. 9 is executed in step S506.

Following the alignment processing of step S506, the designated-state management unit 103 performs termination of the alignment designation in step S2308 and the display controller 104 and content editor 105 start the alignment display in step S2309.

Next, in step S2310, the designated-state management unit 103 determines whether the point from which finger pressure has been removed is a moving point. If it is determined that the point is a moving point, processing is exited.

On the other hand, if it is determined that the point is not a moving point, that is, in the case of a fixed point, the object management unit 106 releases the alignment group in step S2311.

Next, in step S2312, the display controller 104 and content editor 105 terminate the alignment display. Processing is then exited.

It should be noted that if either point is released after the alignment designation is performed, the alignment display is performed. If the moving point is released, the alignment-display state is attained. If the fixed point is released, however, the alignment-display state is terminated.

That is, the alignment-display state continues only in a state in which the fixed point is being maintained. An example of a state in which finger pressure has been removed from the moving point is FIG. 10A, in which the alignment display is presented.

Further, if it is determined at step S2305 that alignment designation is not in progress, then, in step S2312, the object management unit 106 determines whether the alignment display is in progress.

If the state is not the alignment-display state, processing is exited directly. If it is determined that the alignment display is in progress, then the processing of step S2314 is executed.

It is determined in step S2314 whether the point at which designation has been terminated is a fixed point. If this point is a fixed point, then, in step S2315, the object management unit 106 cancels the alignment and restores the objects of the alignment group to the coordinates that prevailed prior to the alignment of the objects.

Next, in step S2311, the object management unit 106 releases the alignment group. Next, in step S2312, the display controller 104 and content editor 105 release the alignment display. Processing is then exited.

An example of a case where designation of a fixed point is terminated during the presentation of the alignment display is FIG. 10E, in which the alignment display is released.

Further, if it is determined in step S2314 that the point is not a fixed point, then, in step S2318, the object management unit 106 determines whether the point from which finger pressure has been removed lies within the area of the alignment group.

If the point is inside this area, then, in step S2316, the designated-state management unit 103 determines whether the point from which finger pressure is that of an alignment object, which means an object should be aligned.

It should be noted that if it is determined that the point is that of an alignment object, then processing is exited without any action being taken. On the other hand, if it is determined that the point is not that of an alignment object, then, in step S2317, the object management unit 106 adds this object to the alignment group as a new alignment object.

This example means that in a case where another object is dragged into an alignment group during the presentation of the alignment display, the object is placed in the alignment group.

Further, if it is determined in step S2318 that the point is not inside the alignment group, then, in step S2319, the object management unit 106 determines whether the designated object is an alignment object. If it is determined that the designated object is not an alignment object, then processing is exited.

On the other hand, if it is determined that the designated object is an alignment object, then, in step S2320, the alignment state is terminated for this object and the designated object is excluded from the alignment group. The example of FIG. 10D corresponds to this situation, with the object 2701 being excluded from the alignment group.

Further, the processing from step S2318 onward drags the object while the fixed point is kept pressed during the alignment display, thereby adding the object to or excluding the object from the alignment group.

It should be noted that in a case where an object in the alignment-display state has been placed on another object, it is not added to the alignment group. Further, only in a case where an object has been selected and left inside the area of an alignment group can this object be added to the alignment group.

In the flowchart of FIG. 14, no consideration is given to processing in a case where finger pressure at one point is removed without performing an alignment designation from a two-point designation. However, this processing can be implemented by adding on the processing of steps S509 and S510 following the "NO" branch in step S2313.

In the first embodiment, if a fixed point has moved, coordinates are changed so as to move the selected object at this fixed point. However, coordinates may be changed so as to move the entire alignment group at this fixed point and the starting point of the alignment at the time of alignment processing may be made the fixed point after the change in coordinates.

Further, in the first embodiment, the first-moved point of two designated points is adopted as the moving point and the other point is adopted as the fixed point.

However, in a case where an alignment object is being pressed at two points, a change in the distance between the two points may be adopted as the path of an alignment designation without a fixed point being decided, and the center between the two points may be adopted as the center point of the alignment.

Further, in a case where an alignment group is pressed at one point and the background is pressed at one point, the point at which the alignment group is being pressed may be decided upon as the moving point beforehand, and the point at which the background is being pressed may be decided upon as the fixed point. In this case, if the fixed point has been moved, then the fulcrum of the alignment also is moved.

In the first embodiment, if finger pressure is removed from one point in a state in which two points have been designated, the single-point designation is restored. That is, in a case where an alignment group is pressed at one point and the background is being pressed at one point, if finger pressure is removed from the point at which the alignment group is being pressed, then the background point becomes the single point in the single-point designation.

In a case where finger pressure is subsequently applied somewhere other than in the alignment group, then alignment designation in a state in which the alignment group is not pressed becomes possible and alignment at a position distanced away from the original alignment group becomes possible.

However, it may be so arranged that when the point at which the alignment group is being pressed is released in a case where the alignment group is pressed at one point and the background is being pressed at one point, the single-point designation also is terminated, the alignment group is released and the state in which only the background point is being pressed during the alignment designation is eliminated.

In the first embodiment, an alignment is performed based upon shape in the direction of movement. However, the distance of the moving point may also be recorded and objects may be aligned by overlapping them or widening the spacing between them so as to fall within the range of this distance.

In a case where path of movement resembles a key, area may be found from the distance moved vertically and the distance moved horizontally and objects may be aligned by overlapping them or widening the spacing between them so as to fall within this area.

In the second embodiment, the order of an alignment is decided by the order of the IDs. However, the order may be changed depending upon another object attribute, for example, the date and time of creation.

Further, with regard to objects to which comments have been appended, those objects having similar comments may be gathered together and placed at nearby positions.

Further, it may be so arranged that objects are placed so that what immediately underlies a first designation is adopted as the starting position of an alignment and what immediately underlies a second designation is adopted as the end point of the alignment.

Further, in the second embodiment, coordinates that prevailed before objects were aligned are restored when an alignment is released. However, it is permissible to adopt an alignment state that reduces the display range, as by overlapping objects in conformity with angle of rotation.

In each of the foregoing embodiments, objects are displayed as rectangles but the invention is not limited to such an arrangement. Further, in case of an object having a complicated contour, vector representation may be used.

In each of the foregoing embodiments, there are three types of inputs for coordinate designation, namely start, move and termination of designation. However, not only move but also continuation may be adopted as a target of processing.

For example, an input event to the touch-sensitive panel is detected continually at fixed time intervals and the type of input is judged depending upon the following conditions:

In a case where an input was not detected at the same position at an immediately preceding detection timing (referred to as "immediately before" below) and, moreover, a point at which there was no input at an adjacent position was detected immediately before, this situation is judged to be "designation start". In a case where an input at the same position as immediately before was detected, this situation is judged to be "continuation".

In a case where an input was detected at a position that did not exist immediately before and, moreover, an input was detected at an adjacent position immediately before but an input is not detected at this position at present (the latest detection timing), this situation is judged to be "designation move". Further, in a case where an input was detected immediately before but not at present, this situation is judged to be "designation termination".

As for the content of continuation processing, it may be so arranged that if an area in which a plurality of objects overlap continues to be pressed for a fixed period of time, all of the objects are placed in the selected state.

In the first embodiment, no mention is made of a method of de-selecting an object. Further, in the second embodiment, no method is made of a method of de-selecting an object in a case where the alignment display is not in progress.

With regard to these instances, in a case where coordinate-designation continuation time is recorded and the time duration of designation and termination is shorter than a prescribed time, this means that there is no designation of an object to be aligned and it is permissible to terminate a selected object by toggling or to de-select a selected object by clicking the background.

Other Embodiments

Although embodiments of the present invention have been described above, the present invention may be applied to a system constituted by a plurality of devices (e.g., a host computer, interface, reader, printer, etc.) or to an apparatus comprising a single device (e.g., a copier or facsimile machine, etc.).

Furthermore, the object of the invention is attained also by supplying a program, which implements the functions of the foregoing embodiments, directly or remotely to a system or apparatus, reading the supplied program codes by the system or apparatus, and then executing the program codes.

Accordingly, since the functions and processing of the present are implemented by computer, the computer program per se installed on the computer also implements the present invention. In other words, the computer program per se for implementing the above-described functions and processing also is one aspect of the present invention.

In this case, so long as the system or apparatus has the functions of the program, the form of the program, for example, object code, a program executed by an interpreter or script data supplied to an operating system, etc., does not matter.

Examples of computer-readable recording media for supplying the program are a flexible disk, hard disk, optical disk, magneto-optical disk, CD-ROM, CD-R and CD-RW.

Further examples of recording media are magnetic tape, a non-volatile type memory card, ROM and DVD (DVD-ROM, DVD-R), etc.

Further, the program may be downloaded from a website on the Internet using a browser possessed by a client computer.

That is, the computer program per se of the present invention or a compressed file that has an automatic installation function may be downloaded to a recording medium such as a hard disk from the website. Further, implementation is possible by dividing the program code constituting the program of the present invention into a plurality of files and downloading the files from different websites.

In other words, there are cases where a WWW server that downloads, to multiple users, the program files that implement the functions and processes of the present invention by computer also is a structural requisite of the present invention.

Further, the program of the present invention may be encrypted, stored on a computer-readable storage medium such as a CD-ROM and distributed to users.

In this case, only users who meet certain requirements are allowed to download decryption key information from a website via the Internet, the encrypted program may be decrypted using the key information and then executed, and the program may be installed on a computer.

Further, the functions of the embodiments may be implemented by having a computer execute a program that has been read.

Furthermore, an operating system or the like running on the computer may perform all or a part of the actual processing based upon the indications in the program. Of course, the functions of the embodiments can be implemented in this case as well.

Furthermore, it may be so arranged that a program that has been read from a recording medium is written to a memory provided on a function expansion board inserted into the computer or provided in a function expansion unit connected to the computer.

A CPU or the like provided on the function expansion board or function expansion unit may perform some or all of the actual processing based upon the indications in the program. There are instances where the functions of the foregoing embodiments are implemented in this manner as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-181985, filed Jul. 11, 2008, and No. 2009-089182, filed Apr. 1, 2009, which are hereby incorporated by reference herein in their entirety.

What is claimed is:

1. An information processing apparatus comprising:
a display unit configured to display a plurality of objects in a specified area, wherein the plurality of objects are not aligned with respect to the specified area;

a touch panel superimposed upon a display surface of the display unit, and configured to recognize that first and second positions in the specified area are respectively touched by first and second fingers of a user at the same time;

a determination unit responsive to a detection of a tracing motion of the second finger while the first finger is continuously touching to the first position on the touch panel, and configured to determine the shape of the trace defined by the detected tracing motion; and an alignment unit, configured to align the plurality of objects on the display unit in accordance with the determined shape of the trace.

2. The apparatus according to claim 1, wherein in a case where the shape of the trace is determined to be a straight line, the alignment unit aligns the plurality of objects in one dimension.

3. The apparatus according to claim 1, wherein in a case where the shape of the trace is determined to be a shape formed by tracing a first straight line along a specific direction and continuously tracing a second straight line along a direction regarded as having substantially a right-angle relationship with respect to the specific direction, the alignment unit aligns the plurality of objects in two dimensions.

4. The apparatus according to claim 1, wherein in a case where the shape of the trace is determined to be an arc, the alignment unit aligns the plurality of objects in a fan-like shape.

5. A method of information processing using an information processing apparatus, said method comprising the steps of:

displaying a plurality of objects in a specified area on a display unit, wherein the plurality of objects are not aligned with respect to the specified area;

recognizing that first and second positions in the specified area are respectively touched by first and second fingers of a user at the same time;

responsive to a detection of a tracing motion of the second finger while the first finger is continuously touching to the first position, determining the shape of the trace defined by the detected tracing motion; and aligning the plurality of objects on the display unit in accordance with the determined shape of the trace.

6. A computer-readable storage medium storing a program for causing a computer to execute the method set forth in claim 5.

7. The apparatus according to claim 1, wherein when the first finger placed on the first position is released from the touch panel after the second finger is released from the touch panel, the alignment unit restores the plurality of objects into an original state in which the plurality of objects are not aligned.

8. The apparatus according to claim 7, wherein when one of the plurality of objects is selected by the second finger and dragged beyond an area of the aligned objects and then the second finger is released from the touch panel while the first finger is continuously touching to the first position on the touch panel, the alignment unit excludes the one of the plurality of objects from a target for the alignment.

9. The method according to claim 5, wherein in a case where the shape of the trace is determined to be a straight line, the alignment step aligns the plurality of objects in one dimension.

10. The method according to claim 5, wherein in a case where the shape of the trace is determined to be a shape formed by tracing a first straight line along a specific direction and continuously tracing a second straight line along a direction regarded as having substantially a right-angle relationship with respect to the specific direction, the alignment step aligns the plurality of objects in two dimensions.

11. The method according to claim 5, wherein in a case where the shape of the trace is determined to be an arc, the alignment step aligns the plurality of objects in a fan-like shape.

12. The method according to claim 5, wherein when the first finger placed on the first position is released from the touch panel after the second finger is released from the touch panel, the alignment step restores the plurality of objects into an original state in which the plurality of objects are not aligned.

13. The method according to claim 12, wherein when one of the plurality of objects is selected by the second finger and dragged beyond an area of the aligned objects and then the second finger is released from the touch panel while the first finger is continuously touching to the first position on the touch panel, the alignment step excludes the one of the plurality of objects from a target for the alignment.

* * * * *